United States Patent

[11] 3,579,199

[72] Inventors Robert A. Anderson;
Alfred H. Faulkner, Santa Barbara, Calif.;
Edwin L. Hughes, Brookfield, Wis.
[21] Appl. No. 795,938
[22] Filed Feb. 3, 1969
[45] Patented May 18, 1971
[73] Assignee General Motors Corporation
Detroit, Mich.

[54] METHOD AND APPARATUS FOR FAULT TESTING A DIGITAL COMPUTER MEMORY
8 Claims, 3 Drawing Figs.

[52] U.S. Cl. .......... 340/172.5, 340/146.1
[51] Int. Cl. .......... G06f 11/04
[50] Field of Search .......... 340/146.1, 172.5; 235/157

[56] References Cited

UNITED STATES PATENTS

| | | | |
|---|---|---|---|
| 3,239,818 | 3/1966 | Petersen et al. .......... | 340/172.5 |
| 3,311,890 | 3/1967 | Waaben .......... | 340/172.5 |
| 3,336,579 | 8/1967 | Heymann .......... | 340/172.5 |
| 3,465,299 | 9/1969 | Schellenberg .......... | 340/172.5 |

*Primary Examiner*—Paul J. Henon
*Assistant Examiner*—Harvey E. Springborn
*Attorneys*—E. W. Christen, C. R. Meland and Tim G. Jagodzinski

ABSTRACT: A digital computer memory is interrogated so as to test its operation. A digital word generator addresses the computer memory with a plurality of test address words identical to a plurality of test data words stored within word storage locations accessed by the test address words. The data words collectively include all coefficients of all powers of the radix of the numerical address code utilized by the digital computer. A digital word comparator detects any noncorrespondence between the test data words retrieved from the accessed word storage locations and the test address words thereby to indicate the presence of a fault within the computer memory.

| TEST ADDRESS WORDS | | | | | | | | | | | | | | | | |
|---|---|---|---|---|---|---|---|---|---|---|---|---|---|---|---|---|
| | OCTAL | | | | BINARY | | | | | | | | | | | |
| ⊠ | 4 | 3 | 2 | 1 | 12 | 11 | 10 | 9 | 8 | 7 | 6 | 5 | 4 | 3 | 2 | 1 |
| 1 | 0 | 7 | 2 | 1 | 0 | 0 | 0 | 1 | 1 | 1 | 0 | (1) | 0 | 0 | 0 | 1 |
| 2 | 4 | 3 | 5 | 0 | (1) | 0 | 0 | 0 | 1 | 1 | 1 | 0 | 1 | 0 | 0 | 0 |
| 3 | 2 | 1 | 6 | 4 | 0 | 1 | 0 | 0 | 0 | 1 | 1 | 1 | 0 | 1 | 0 | 0 |
| 4 | 5 | 0 | 7 | 2 | 1 | 0 | 1 | 0 | 0 | 0 | 1 | 1 | 1 | 0 | 1 | 0 |
| 5 | 6 | 4 | 3 | 5 | 1 | 1 | 0 | 1 | 0 | 0 | 0 | 1 | 1 | 1 | 0 | 1 |
| 6 | 7 | 2 | 1 | 6 | 1 | 1 | 1 | 0 | 1 | 0 | 0 | 0 | 1 | 1 | 1 | 0 |
| 7 | 3 | 5 | 0 | 7 | 0 | 1 | 1 | 1 | 0 | 1 | 0 | 0 | 0 | 1 | 1 | 1 |
| 8 | 1 | 6 | 4 | 3 | 0 | 0 | 1 | 1 | 1 | 0 | 1 | 0 | 0 | 0 | 1 | 1 |

INVENTORS
Robert A. Anderson,
Alfred H. Faulkner, &
BY Edwin L. Hughes

INVENTORS
BY Robert A. Anderson,
Alfred H. Faulkner, &
Edwin L. Hughes

METHOD AND APPARATUS FOR FAULT TESTING A DIGITAL COMPUTER MEMORY

This invention relates to a fault-testing system for a digital computer memory, and more particularly to a digital computer memory incorporating a fault-testing system for interrogating the computer memory so as to verify its integrity.

A conventional digital computer memory typically comprises a storage section including a plurality of word storage locations for storing digital data words having multiple digital bits, an address section for selectively accessing the word storage locations, a readout section for retrieving stored data words from the accessed word storage locations, and a write-in section for inserting data words into the accessed word storage locations. The subject invention is primarily concerned with substantiating the satisfactory operation of the address section of a digital computer memory, although at least portions of the other sections of the computer memory are tested as well. The address section ordinarily includes an address register for receiving and retaining digital address words identifying selected word storage locations and a memory selector including a plurality of selection circuits energizable in various combinations for accessing the word storage locations identified by the address words.

According to one aspect of the subject invention, a digital computer memory is interrogated by a malfunction-detecting technique and system so as to test the operation of the computer memory. In general, this is accomplished by generating a plurality of test address words identical to a plurality of test data words stored within the storage section at word storage locations identified by the test address words, addressing the storage section with the test address words through the address section so as to access the identified word storage locations, retrieving the stored test data words from the accessed word storage locations through the readout section, and comparing the retrieved test data words with the generated test address words in order to detect any difference between them thereby to indicate the presence of a fault in one of the sections of the computer memory.

In another aspect of the subject invention, the address register and all of the selection circuits of the memory selector are exercised and monitored so as to detect any malfunction of the address section. In general, this is accomplished by employing a series of test address words which collectively represent all coefficients of all powers of the radix of the numerical address code utilized by the computer memory.

According to yet another aspect of the subject invention, any detected malfunction of one of the sections of the computer memory is quickly located during the fault test. Basically, this is accomplished by providing a fault monitor which identifies the particular test address word and test data word giving rise to the detected malfunction.

In still another aspect of the subject invention, the size and complexity of the fault-testing system is minimized. Generally, this is accomplished by providing a digital word generator which successively develops the desired series of test address words by relatively shifting discrete digital bits as the test address words are recirculated through the generator, and by providing a digital word comparator which detects any noncorrespondence between the discrete digital bits of the retrieved test data words and the generated test address words.

The subject invention will be best understood by reference to the following detailed description of a preferred embodiment when considered in conjunction with the accompanying drawing, in which.

Figures 1, 2:
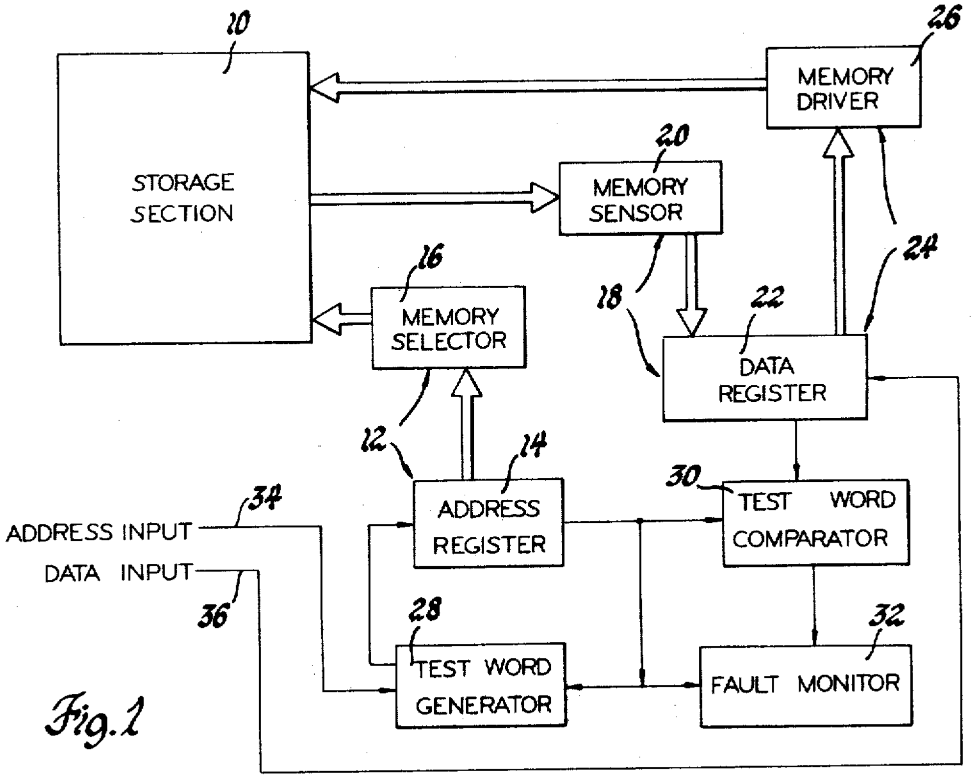
FIG. 1 is a block diagram of a conventional digital computer memory incorporating a preferred embodiment of the invention.
FIG. 2 is a table listing a sample series of test address words which may be utilized by the preferred embodiment of the subject invention.

FIG. 1 discloses a conventional digital computer memory. A storage section 10 includes a plurality of word storage locations for storing digital data words having multiple digital bits. An address section 12 includes an address register 14 for receiving and retaining binary coded digital address words identifying selected word storage locations within the storage section 10, and a memory selector 16 for accessing the identified word storage locations. A readout section 18 includes a memory sensor 20 for retrieving stored data words from within the accessed word storage locations of the storage section 10, and a data register 22 for receiving and retaining the retrieved data words. A write-in section 24 includes the data register 22 which receives and retains input data words as well as the retrieved data words, and a memory driver 26 for inserting the retained data words into the accessed word storage locations of the memory section 10.

FIG. 1 also discloses a preferred embodiment of the fault-testing system of the subject invention. A test word generator 28 produces a series of test address words. A test word comparator 30 detects any difference between the generated series of test address words and a stored series of test data words. A fault monitor 32 identifies any noncorresponding test address words and test data words.

In operation, the test word generator 28 develops a plurality of test address words identical to a plurality of test data words previously stored within the storage section 10 at special word storage locations identified by the test address words. Thus, each special word storage location contains a test data word which is identical to a test address word which identifies the special word storage location. The test address words developed by the generator 28 are introduced in serial-by-bit fashion into the address register 14. The address register 14 transfers the test words in parallel-by-bit fashion to the memory selector 16 and in serial-by-bit fashion to the test word comparator 30. The memory selector 16 accesses the word storage locations identified by the test address words in parallel-by-bit fashion. The memory sensor 20 retrieves the stored test data words from the accessed word storage locations in parallel-by-bit fashion and introduces the test data words into the data register 22 in parallel-by-bit fashion. The data register 22 transfers the test data words in parallel-by-bit fashion to the memory driver 26 and in serial-by-bit fashion to the test word comparator 30. The memory driver 26 reinserts the test data words back into the accessed word storage locations in parallel-by-bit fashion to await the next fault test. The test word comparator 30 serially compares the discrete digital bits of each test address word with the discrete digital bits of each related test data word so as to detect any noncorrespondence between the digital bits of the test words thereby to indicate the presence of a fault within the computer memory. The fault monitor 32 senses the test words transferred to the comparator 30 and samples the output of the comparator 30 so as to identify the particular test address words and test data words giving rise to a detected noncorrespondence.

Thus, the fault-testing system of the subject invention interrogates the computer memory so as to test the operation of the address register 14, the memory selector 16, the memory sensor 20, the data register 22, and the memory driver 26 during each fault test. If all of these portions of the computer memory are functioning properly, the test address words and the test data words will correspond. However, if one of these portions of the computer memory is not functioning properly, the test address words and the test data words will not correspond. Hence, the fault-testing system monitors the operation of the computer memory as a function of the correspondence between the discrete digital bits of the test address words and the test data words. Ideally, the normal routine of the digital computer is interrupted periodically and a fault test of the computer memory is performed by the fault-testing system.

In initially inserting the test data words into the storage section 10 of the computer memory, the test address words are introduced in serial-by-bit fashion into the address register 14 via an address input 34 through the test word generator 28, and the identified word storage locations are accessed by the memory selector 16 in parallel-by-bit fashion. Concurrently, the test data words are introduced in serial-by-bit fashion into the data register 22 via a data input 36 and inserted into the accessed word storage locations by the memory driver 26 in parallel-by-bit fashion.

Typically, the memory selector 16 includes a plurality of selection or switching circuits such that each normal digital address word energizes a different combination of the selection circuits thereby to access the particular word storage location identified by the address word in parallel-by-bit fashion. In the preferred embodiment of the subject invention, the plurality of test address words utilized by the fault-testing system are chosen so as to exercise every selection circuit of the memory selector 16.

Ordinarily, the digital address words of a computer memory comprise a series of binary coded numerals each of which represents a coefficient of a power of the radix or base of the numerical address code utilized by the computer memory. Thus, for an octal address code, the digital address word 010001110100 expresses in binary coded form the octal number 2164 which may be written as $4\times8^0$ plus $6\times8^1$ plus $1\times8^2$ plus $2\times8^3$, where the radix is 8, the powers are 0, 1, 2 and 3, and the coefficients are 2, 1, 6 and 4. The coefficients of the powers of the radix are limited to numerals ranging between zero and one less than the radix. Although an octal address code is illustrated, it is to be noted that the fault-testing system of the subject invention is in no way restricted to an octal address code and any other numerical address code could also be employed, including a system using more than one radix.

In general, each power of the radix of the numerical address code of a computer memory regulates the energization of a separate group of selection circuits within the memory selector 16, and each character of each power of the radix controls the energization of a specific selection circuit within each group. The combination of the energized selection circuits operates to access the particular word storage location identified by the binary coded numerals of the address word which represent the coefficients of the powers of the radix of the numerical address code. Therefore, in order to exercise every selection circuit within the memory selector 16, it is only necessary that all coefficients of all powers of the radix of the numerical address code be represented within the selected series of test address words. Brief reflection will quickly indicate that the minimum number of address words necessary to accomplish this objective is a number equal to the radix of the numerical address code.

The test address words listed in the table of FIG. 2 form one convenient set of test address words for interrogating a computer memory utilizing an octal address code including powers 0, 1, 2 and 3. It is to be noted that all values of each of the coefficients of all powers of the radix are represented among the listed set of test address words. In addition, it will be observed that the listed binary coded test address words corresponding to the listed octal coded test address words reveal a repeatable digital bit pattern. The repeatable pattern suggests a progression from each preceding word to each succeeding word by shifting each digital bit of the preceding word to the next lowest position to the right in the succeeding word and inserting the digital bit in the fifth position of the preceding word into the 12th position of the succeeding word. A set of test address words exhibiting such a repeatable digital bit pattern may be successively generated employing simple logic gates. Similar convenient sets of test address words can be ascertained for any desired numerical address code by anyone of ordinary skill in the art utilizing well-known digital design techniques. Of course, it is to be remembered that the test data words are always identical to the test address words.

Figure 3:
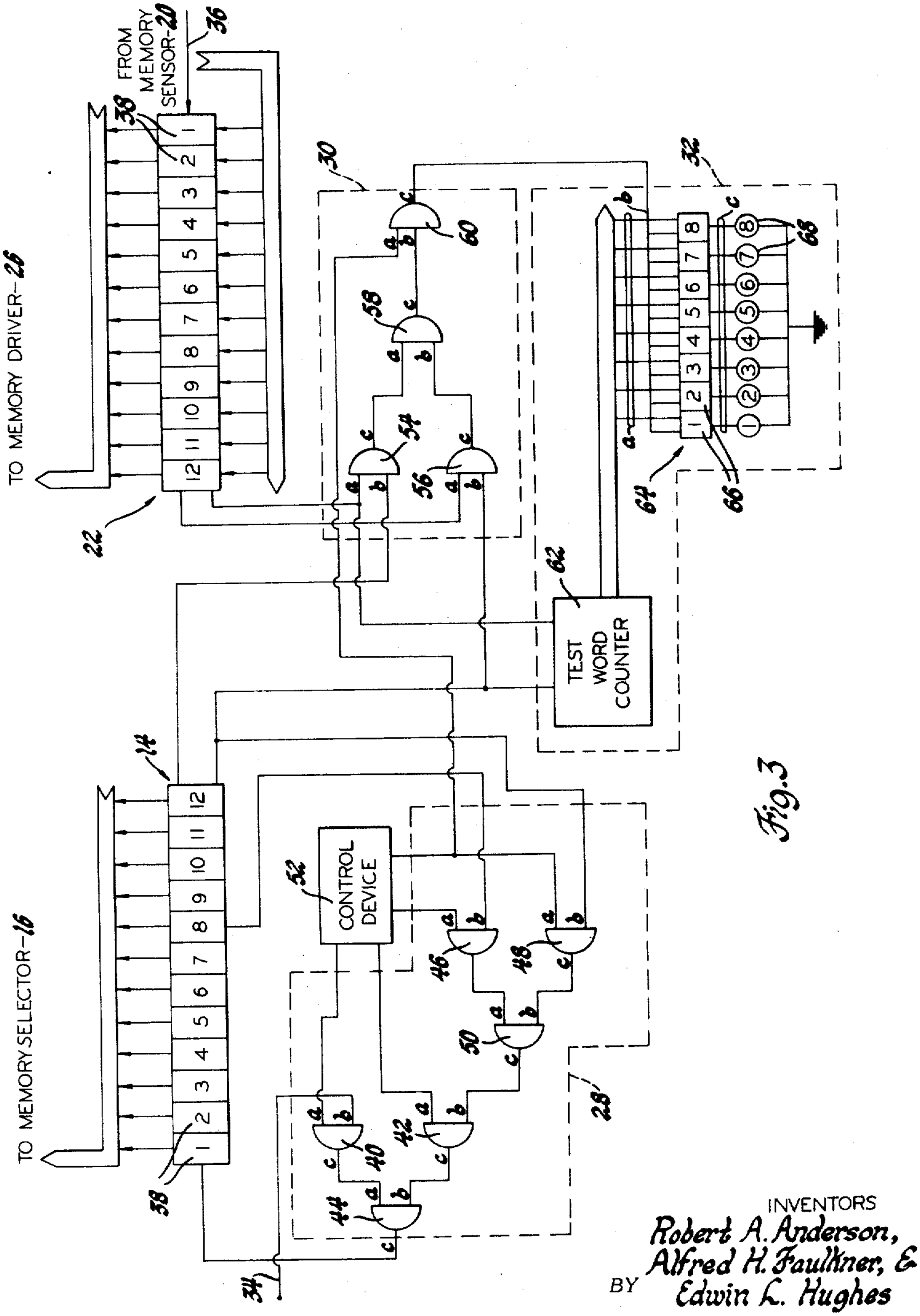
FIG. 3 is a logic diagram of the preferred embodiment of the subject invention.

FIG. 3 is a logic diagram of the preferred embodiment of the fault-testing system of the subject invention together with the address register 14 and the data register 22 of the computer memory. The operation of the illustrated logic diagram will be described utilizing the set of test address words listed in the table of FIG. 2. The address register 14 and the data register 22 may be ordinary digital shift registers composed of a plurality of interconnected stages 38 which may be flip-flops. Each of the register stages 38 is capable of receiving and retaining a single bit and of providing a complemented and uncomplemented reproduction of the retained digital bit. For purposes of demonstration, the address register 14 and the data register 22 are illustrated as having stages 38 numbered 1 through 12 for accommodating digital words containing 12 digital bits. However, it is to be understood that the address register 14 and the data register 22 could have a greater or lesser number of stages 38 depending upon the requirements of a particular computer memory.

The test word generator 28 and the test word comparator 30 are constructed of a plurality of NOR logic gates having dual inputs *a* and *b* and a single output *c*. A NOR logic gate performs the function of producing a ONE output signal at the output *c* only when both input signals applied to the inputs *a* and *b* are ZERO. A dual input NOR logic gate may be considered to be logically enabled when a ZERO input signal is applied to one of the inputs *a* and *b*, and to be logically disabled when a ONE input signal is applied to one of the inputs *a* and *b*. When enabled by applying a constant ZERO input signal to one of the inputs *a* and *b*, the output signal at the output *c* of a dual input NOR logic gate is the complement of the input signal applied to the other one of the inputs *a* and *b*. It will be appreciated that NOR logic gates are shown for illustrative purposes only, and that other types of logic gates could also be employed.

The test word generator 28 comprises a plurality of dual input NOR logic gates 40 through 50. The output *c* of the gate 40 is connected to the input *a* of the gate 44, and the output *c* of the gate 42 is connected to the input *b* of the gate 44. The output *c* of the gate 44 is connected to the input of stage 1 of the address register 14. The uncomplemented output of stage 8 of the address register 18 is connected to the input *b* of the gate 46 and the uncomplemented output of stage 12 of the address register 18 is connected to the input *b* of the gate 48. The output of the gate 46 is connected to the input *a* of the gate 50, and the output *c* of the gate 48 is connected to the input *b* of the gate 50. The output *c* of the gate 50 is connected to the input *b* of the gate 42. The inputs *a* of the gates 40, 42, 46 and 48 are connected to an external control device 52 for developing enabling and disabling signals. The input *b* of the gate 40 is connected to the address input 34.

In normal operation, the control device 52 applies a ZERO enabling input signal to the input *a* of the logic gate 40, and a ONE disabling input signal to the input *a* of the logic gate 42. Normal binary coded address words are applied in serial-by-bit fashion to the input *b* of the enabled gate 40 via the address input 34. The digital bits of the normal address words are complemented by the gate 40, uncomplemented by the gate 44, and serially introduced into the address register 14 through stage 1. The address register 14 transfers the normal address words in parallel-by-bit fashion to the memory selector 16, and the computer memory is normally operated as previously described.

In test operation, the first test address word in the set of binary coded octal test address words listed in FIG. 2 is introduced into the address register 14 through the gates 40 and 42 in the normal manner. This first test address word is serially shifted through the stages 38 of the address register 14 so that the first digital bit is retained within stage 12, the second digital bit is retained within stage 11, and so on through the 12th digital bit which is retained within stage 1. Then, the control device 52 applies a ONE disabling input signal to the input *a* of the gates 40 and 46, and a ZERO enabling input to the input *a* of the gates 42 and 48. Next, the first test address word is serially shifted out of the address register 14 and transmitted to the test word comparator 30 and to the input *b* of the enabled gate 48. The digital bits of the first test address word are complemented by the gate 48, uncomplemented by the gate 50, complemented by the gate 42, uncomplemented by the gate 44, and reintroduced into the address register 14.

After the first test address word has been reintroduced into the address register 14, the control device 52 applies a ZERO enabling input signal to the input *a* of the gate 46 and a ONE disabling input signal to the input *a* of the gate 48. Then, each digital bit of the first test address word is shifted to the next higher one of the stages 38 within the address register 14 so that the first digital bit of the first test address word is shifted out of the address register 14 and applied to the input *b* of the disabled gate 48. Since the gate 48 is disabled, this digital bit is dissipated. Next, the digital bit retained within stage 8 of the address register 14, which is the sixth digital bit of the first test address word due to the recirculation of the first test address word, is applied to the input *b* of the enabled gate 46. This digital bit is complemented by the gate 46, uncomplemented by the gate 50, complemented by the gate 42, uncomplemented by the gate 44, and introduced into stage 1 of the address register 14 so as to form the 12th digital bit of the second test word now retained within the address register 14. This recirculation of test address words and shifting of digital bits is repeated until all of the binary coded octal test address words listed in the table of FIG. 2 have been developed by the test word generator 28 and introduced into the address register 14.

As previously described, the word storage locations of the storage section 10 which are identified by the test address words introduced into the address register 14 are accessed by the memory selector 16. Then, the test data words stored within the accessed word storage locations are retrieved from the storage section 10 and introduced into the data register 22 by the memory sensor 20. Next, the retrieved test data words are reinserted within the accessed word storage locations of the storage section 10 by the memory driver 26. Again, it will be appreciated that the test address words and the test data words will correspond only if the above-mentioned portions of the computer memory are operating satisfactorily.

The test word comparator 30 comprises a plurality of dual input NOR logic gates 54 through 60. The complemented output of stage 12 of the address register 14 is connected to the input *b* of the gate 54, and the uncomplemented output of stage 12 of the address register 14 is connected to the input *b* of the gate 56. The complemented output of stage 12 of the data register 22 is connected to the input *a* of the gate 56, and the uncomplemented output of stage 12 of the data register 22 is connected to the input *a* of the gate 54. The output *c* of the gate 54 is connected to the input *a* of the gate 58, and the output *c* of the gate 56 is connected to the input *b* of the gate 58. The output *c* of the gate 58 is connected to the input *b* of the gate 60. The input *a* of the gate 60 is connected to the input *a* of the gate 48 in in the test word generator 28 which is connected to the control device 52.

In test operation, as the generated test address words are shifted out of the address register 14, the complemented digital bits of the test address words are applied to the input *b* of the gate 54 and the uncomplemented digital bits of the test address words are applied to the input *b* of the gate 56. Similarly, as the retrieved test data words are shifted out of the data register 22, the complemented digital bits of the test data words are applied to the input *a* of the gate 56 and the uncomplemented digital bits of the test data words are applied to the input *a* of the logic gate 54. Since the input signals applied to the inputs *a* and *b* of the gates 54 and 56 are complementary, the output signals of the gates 54 and 56 will both be ZERO providing that related ones of the test address words and the retrieved test data words correspond. However, if a discrete digital bit of a test address word and the same discrete digital bit of the related test data word do not correspond, the output signal of either the gate 54 or the gate 56 will be ONE.

The output signal of the gate 58 is ZERO when the output signal of either the gate 54 or the gate 56 is ONE, and the output signal of the gate 58 is ONE when both output signals of the gates 54 and 56 are ZERO. The control device 52 applies a ZERO enabling input signal to the input *a* of the gate 60 whenever a ZERO enabling input signal is applied to the input *a* of the gate 48 in the test word generator 28. Thus, providing it is enabled, the output signal of the gate 60 is a ZERO when the output signal of the gate 58 is a ONE thereby indicating that the test address word and the related test data word correspond, and the output signal of the gate 60 is a ONE when the output signal of the gate 58 is a ZERO thereby indicating that the test address word and the related test data word do not correspond.

The fault monitor 32 comprises a test word counter 62 for continuously sensing the particular test words currently under examination in the test word comparator 30, and an indicator 64 for identifying the particular test words under examination in the test word comparator 30 during the occurrence of a noncorrespondence. The indicator 64 includes a plurality of bistable elements or flip-flops 66 each having an enabling input *a*, a switching input *b* and a single output *c*, and an equal plurality of signal lamps 68 each connected between the output *c* of a different associated one of the flip-flops 66 and ground. The flip-flops 66 and the signal lamps 68 are numbered 1 through 8 so as to correspond with like numbered ones of the octal coded test address words listed in the table of FIG. 2. Each of the flip-flops 66 performs the function of switching states so as to provide a high output voltage signal at the output *c* only when an enabling input signal is applied to the enabling input *a* and a ONE input signal is applied to the switching input *b*. The counter 62 includes inputs connected to the uncomplemented output of stage 12 of the address register 14 and to the uncomplemented output of stage 12 of the data register 22, and a plurality of outputs each connected to the enabling input *a* of a different one of the flip-flops 66. The output *c* of the gate 60 in the test word comparator 30 is connected to the switching input *b* of each of the flip-flops 66.

In test operation, the counter 62 continuously senses the transfer of test address words and test data words into the test word comparator 30, and applies an enabling input signal to the enabling input *a* of corresponding ones of the flip-flops 66. When a noncorrespondence occurs between a test address word and the related test data word, a ONE input signal is applied by the gate 60 to the switching input *b* of each of the flip-flops 66 so as to switch the state of the enabled one of the flip-flops 66. The switched one of the flip-flops 66 produces a continuous high output voltage signal which energizes the associated one of the signal lamps 68 thereby to provide a sustained signal indicating the particular test address word and test data word producing the detected noncorrespondence. It is to be understood that the illustrated fault monitor 32 is shown for demonstration purposes only, and many other types of fault monitors could also be employed in conjunction with the fault testing system of the subject invention.

As will be readily appreciated, once the particular test address word and test data word producing a noncorrespondence are known, the search for the malfunctioned circuit responsible for the fault can be confined to those circuits of the computer memory which are exercised by the particular test words. More specifically, where the address register 14, the memory sensor 16, the data register 22 and the memory driver 26 are determined to be functioning properly by a parity check or some other test, the search for the malfunctioned circuit can be further confined to those selection circuits of the memory selector 16 which are exercised by the particular test address word giving rise to the detected noncorrespondence. Thus, it will now be apparent that the subject invention provides an effective method and apparatus for generally interrogating a digital computer memory so as to test its operation, and for particularly exercising and monitoring the selection circuits of the memory selector portion of the computer memory.

It is to be understood that the subject invention is not restricted to the previously described preferred embodiment which may be variously altered and modified without departing from the spirit and scope of the subject invention which is to be limited only by the following claims.

We claim:

1. A digital computer memory having a given numerical address code, comprising: storage means including a plurality of test data word storage locations collectively containing a plurality of test data words identical to a plurality of test address words identifying the test data word storage locations, the test address words collectively including all coefficients of all powers of the radix of the given numerical address code; address means connected to the storage means for accessing the test data word storage locations in response to the receipt of the test address words identifying the test data word storage locations; generator means connected to the address means for generating the test address words and transferring them to the address means so as to access the test data word storage locations identified by the test address words; readout means connected to the storage means for retrieving the test data words contained within the test data word storage locations accessed by the address means; and comparator means connected to the readout means and to the address means for detecting any difference between the generated test address words and the retrieved test data words thereby to indicate the presence of a fault within the computer memory.

2. A digital computer memory having a given numerical address code, comprising: storage means including a plurality of test data word storage locations each containing a test data word identical to a related test address word which identifies the test data word storage location, the test address words collectively including all coefficients of all powers of the radix of the given numerical address code; address means connected to the storage means for accessing the test data word storage locations in response to the receipt of the test address words identifying the test data word storage locations; generator means connected to the address means for generating the test address words and for transferring the generated test address words to the address means so as to access the test data word storage locations identified by the generated test address words; readout means connected to the storage means for retrieving the test data words contained within the test data word storage locations accessed by the address means; and comparator means connected to the readout means and to the address means for comparing the discrete digital bits of related ones of the generated test address words and the retrieved test data words thereby to monitor the operation of the computer memory as a function of the correspondence between the digital bits of the test words.

3. A digital computer memory as recited in claim 2 including write-in means connected to the storage means for inserting the test data words retrieved by the readout means back within the test data word storage locations accessed by the address means.

4. A digital computer memory having a given numerical address code comprising: storage means including a plurality of test data word storage locations each containing a test data word identical to a related test address word identifying the test data word storage location, the test address words collectively including all coefficients of all powers of the radix of the given numerical address code; address means connected with the storage means and including memory selector means having a plurality of selection circuits energizable in various combinations for accessing the test data word storage locations in response to the receipt of the test address words identifying the test data word storage locations, each power of the radix of the numerical address code regulating the energization of a particular group of selection circuits and each coefficient of each power of the radix of the numerical address code controlling the energization of a specific selection circuit within each particular group so that all of the selection circuits are exercised by the test address words; generator means connected with the address means for generating the test address words and for transferring the generated test address words to the address means so as to access the test data word storage locations identified by the generated test address words; readout means connected with the storage means for retrieving the test data words contained within the accessed test data word storage locations; and comparator means connected with the readout means and with the address means for detecting any noncorrespondence between the discrete digital bits of related ones of the generated test address words and the retrieved test data words thereby to monitor the operation of the computer memory as a function of the correspondence between the digital bits of the test words.

5. A digital computer memory as recited in claim 4 including write-in means connected with the storage means for inserting the test data words retrieved by the readout means back into the test data word storage locations accessed by the address means.

6. A digital computer memory as recited in claim 4 wherein the generator means successively develops each succeeding test address word by relatively shifting the digital bits of each preceding test address word in a predetermined repeatable manner, and the comparator means serially compares the discrete digital bits of each test address word with the discrete digital bits of each related test data word so as to detect any noncorrespondence between the digital bits of the test words thereby to indicate the presence of a fault within the computer memory.

7. A digital computer memory as recited in claim 4 including fault monitor means for identifying the particular test address word and test data word giving rise to a detected noncorrespondence between their digital bits.

8. A method for fault testing a digital computer memory having storage means including a plurality of data word storage locations for storing data words, address means connected with the storage means for accessing data word storage locations identified by address words applied to the address means in a given numerical address code, and readout means connected with the storage means for retrieving data words stored within the data word storage locations accessed by the address means, the method comprising the steps of: loading each of the data word storage locations with a data word identical to a related address word identifying the data word storage location; generating address words each identifying a different one of the data word storage locations, the address words collectively containing all coefficients of all powers of the radix of the given numerical address code; accessing the data word storage locations identified by the generated address words; retrieving the data words stored within the accessed data word storage locations; comparing the discrete digital bits of related ones of the generated address words and the retrieved data words so as to monitor the operation of the computer memory as a function of the correspondence between the digital bits of the test words.